US010890223B2

(12) United States Patent
Ishizaki et al.

(10) Patent No.: US 10,890,223 B2
(45) Date of Patent: Jan. 12, 2021

(54) DISC BRAKE CALIPER

(71) Applicant: Shimano Inc., Osaka (JP)

(72) Inventors: Hiroyuki Ishizaki, Osaka (JP); Takahiro Tabata, Osaka (JP); Takane Aoyama, Osaka (JP)

(73) Assignee: Shimano Inc., Osaka (JP)

(\*) Notice: Subject to any disclaimer, the term of this patent is extended or adjusted under 35 U.S.C. 154(b) by 25 days.

(21) Appl. No.: 16/353,403

(22) Filed: Mar. 14, 2019

(65) Prior Publication Data

US 2020/0292018 A1  Sep. 17, 2020

(51) Int. Cl.
| | | |
|---|---|---|
| *F16D 65/00* | (2006.01) | |
| *F16D 65/18* | (2006.01) | |
| *F16D 55/228* | (2006.01) | |
| *B62L 3/02* | (2006.01) | |
| B62L 3/00 | (2006.01) | |
| F16D 55/00 | (2006.01) | |
| F16D 121/04 | (2012.01) | |

(52) U.S. Cl.
CPC .......... *F16D 65/0075* (2013.01); *B62L 3/023* (2013.01); *F16D 55/228* (2013.01); *F16D 65/0056* (2013.01); *F16D 65/18* (2013.01); F16D 2055/002 (2013.01); F16D 2055/0008 (2013.01); F16D 2121/04 (2013.01); F16D 2200/003 (2013.01); F16D 2250/0007 (2013.01); F16D 2250/0084 (2013.01)

(58) Field of Classification Search
CPC ........ F16D 55/18; F16D 55/22; F16D 55/228; F16D 55/24; F16D 65/0068; F16D 65/18

USPC .......... 188/71.1, 72.4, 72.6, 18 A, 24.11, 26
See application file for complete search history.

(56) References Cited

U.S. PATENT DOCUMENTS

| | | | |
|---|---|---|---|
| 6,581,905 B2 | 6/2003 | Rafko et al. | |
| 8,365,878 B2 | 2/2013 | Takizawa et al. | |
| 9,347,505 B2 * | 5/2016 | Noborio | B62L 3/023 |
| 9,533,733 B2 | 1/2017 | Noborio et al. | |
| 10,385,937 B2 * | 8/2019 | Iwai | F16D 65/0068 |
| 2007/0163851 A1 * | 7/2007 | Alexander | F16D 65/853 188/264 F |
| 2012/0000783 A1 * | 1/2012 | Suda | C25D 11/026 205/50 |
| 2015/0001014 A1 | 1/2015 | Noborio et al. | |
| 2015/0183488 A1 * | 7/2015 | Hirotomi | F16D 65/18 188/26 |
| 2015/0308524 A1 * | 10/2015 | Nakakura | F16D 55/22 188/71.1 |
| 2016/0252146 A1 * | 9/2016 | Huang | F16D 55/224 188/72.4 |
| 2016/0347301 A1 | 12/2016 | Gallagher | |
| 2018/0290707 A1 | 10/2018 | Nago | |

\* cited by examiner

*Primary Examiner* — Christopher P Schwartz

(74) *Attorney, Agent, or Firm* — Global IP Counselors, LLP

(57) ABSTRACT

A disc brake caliper is basically provided with a single main body and an end cap. The single main body includes a hydraulic cylinder bore partially defining a hydraulic chamber having a cylinder axis and an end bore disposed along the cylinder axis. The end cap is coupled to the single main body in the end bore so as to close the hydraulic chamber. The end cap has an exterior surface that is free of a tool engagement structure.

18 Claims, 12 Drawing Sheets

DISC BRAKE CALIPER

BACKGROUND

Technical Field

This disclosure generally relates to a disc brake caliper for human-powered vehicles such as bicycles.

Background Information

Generally, there are several types of brake devices currently available on the market for human-powered vehicles. Examples of some types of common bicycle brake devices include rim brakes and disc brakes. Disc brakes have become more popular for human-powered vehicles such as bicycles. In particular, disc brakes provide substantial braking power in relation to an amount of braking force applied to a brake lever or a pedal as compared to rim brakes. Moreover, disc brake systems typically provide a high level of braking consistency in all types of weather and riding conditions. Disc brakes can be either cable operated or hydraulically operated.

SUMMARY

Generally, the present disclosure is directed to various features of a disc brake caliper. In one feature, a disc brake caliper is provided with a main body having a clean and attractive appearance.

In view of the state of the known technology and in accordance with a first aspect of the present disclosure, a disc brake caliper is provided that basically comprises a single main body and an end cap. The single main body includes a hydraulic cylinder bore partially defining a hydraulic chamber having a cylinder axis and an end bore disposed along the cylinder axis. The end cap is coupled to the single main body in the end bore so as to close the hydraulic chamber. The end cap has an exterior surface that is free of a tool engagement structure.

With the disc brake caliper according to the first aspect, the main body can be provided without any visible tool engagement structure for forming a hydraulic chamber so that the main body has a clean and attractive appearance.

In view of the state of the known technology and in accordance with a second aspect of the present disclosure, a disc brake caliper is provided that basically comprises a single main body and an end cap. The single main body includes a hydraulic cylinder bore partially defining a hydraulic chamber having a cylinder axis and an end bore disposed along the cylinder axis. The end cap is coupled to the single main body in the end bore so as to close the hydraulic chamber. The end cap has an exterior surface that is entirely a continuous even surface.

With the disc brake caliper according to the second aspect, the main body can be provided with a clean and attractive appearance in the area of the end cap that closes the hydraulic chamber.

In accordance with a third aspect of the present disclosure, the disc brake caliper according to the first or second aspect further comprises a surface treatment overlying an exterior surface of the single main body and the exterior surface of the end cap.

With the disc brake caliper according to the third aspect, it is possible to easily hide a seam between the main body and the end cap.

In accordance with a fourth aspect of the present disclosure, the disc brake caliper according to the third aspect is configured so that the surface treatment includes a paint layer that covers an external seam line between the exterior surface of the single main body and the exterior surface of the end cap.

With the disc brake caliper according to the fourth aspect, it is possible to provide the main body with a one-piece appearance.

In accordance with a fifth aspect of the present disclosure, the disc brake caliper according to the third aspect is configured so that the surface treatment includes an anodic oxide coating.

With the disc brake caliper according to the fifth aspect, it is possible to provide the main body with a preferable metallic color.

In accordance with a sixth aspect of the present disclosure, the disc brake caliper according to any one of the first to fifth aspects further comprises a sealing bolt plugging an opening in the single main body. The sealing bolt includes a head portion and a shaft portion extending from the head portion. The shaft portion has a first fluid bore extending in an axial direction of the shaft portion and a second fluid bore extending in in a traverse direction of the shaft portion. The second fluid bore is in fluid communication with the first fluid bore. The shaft portion has a threaded section disposed on an opposite side of the second fluid bore from the head portion. The single main body includes a first hydraulic fluid passage in fluid communication with the hydraulic chamber and a second hydraulic fluid passage in fluid communication with the first hydraulic fluid passage via the first and second fluid bores of the sealing bolt.

With the disc brake caliper according to the sixth aspect, it is possible to easily interconnect a pair of internal fluid passages in the single main body.

In accordance with a seventh aspect of the present disclosure, the disc brake caliper according to the sixth aspect is configured so that the shaft portion of the sealing bolt includes a reduced section having a cross sectional width that is reduced as compared to a cross sectional width of the threaded section, the second fluid bore being disposed in the reduced section.

With the disc brake caliper according to the seventh aspect, the fluid can flow around the reduced section of the shaft portion of the sealing bolt.

In accordance with an eighth aspect of the present disclosure, the disc brake caliper according to the sixth or seventh aspect is configured so that the hydraulic cylinder bore constitutes a first hydraulic cylinder bore and the hydraulic chamber constitutes a first hydraulic chamber. The single main body further includes a second hydraulic chamber. The first hydraulic fluid passage extends between the first hydraulic chamber and the second hydraulic fluid passage. The second hydraulic fluid passage extends between the second hydraulic chamber and the first hydraulic fluid passage.

With the disc brake caliper according to the eighth aspect, a strong braking power can be obtained providing a pair of hydraulic chambers so that a brake rotor can be squeezed from both axially facing sides.

In accordance with a ninth aspect of the present disclosure, the disc brake caliper according to any one of the first to eighth aspects is configured so that the single main body has a brake rotor receiving slot.

With the disc brake caliper according to the ninth aspect, a brake rotor can be received in the brake rotor receiving slot so that a stably braking power can be applied to the brake rotor.

In accordance with a tenth aspect of the present disclosure, the disc brake caliper according to any one of the first to eighth aspects is configured so that the single main body is configured to be mounted to a human-powered vehicle defining a center plane, and the end bore and the end cap are arranged opposite to the center plane with respect to the single main body in a mounted state where the single main body is mounted to the human-powered vehicle.

With the disc brake caliper according to the tenth aspect, at least one hydraulic chamber is mounted to the human-powered vehicle so that at least partially a braking force is applied in a direction towards a center plane of the human-powered vehicle.

In accordance with an eleventh aspect of the present disclosure, the disc brake caliper according to the ninth or tenth aspect further comprises a brake pad and a piston. The brake pad is movably coupled to the single main body in the brake rotor receiving slot. The piston partially defines a hydraulic chamber and is movably disposed in the hydraulic cylinder bore along the cylinder axis.

With the disc brake caliper according to the eleventh aspect, the disc brake caliper has a brake pad which can be replaced as needed.

In accordance with a twelfth aspect of the present disclosure, the disc brake caliper according to any one of the first and third to eleventh aspects is configured so that the exterior surface of the end cap is entirely a continuous even surface.

With the disc brake caliper according to the twelfth aspect, the main body can be provided with a clean and attractive appearance in the area of the end cap.

In accordance with a thirteenth aspect of the present disclosure, the disc brake caliper according to any one of the first to twelfth aspects is configured so that the exterior surface of the end cap defines an outer peripheral edge that is flush with an outer peripheral edge of the end bore.

With the disc brake caliper according to the thirteenth aspect, the main body can be provided with a clean and attractive appearance in the area of the end cap.

In accordance with a fourteenth aspect of the present disclosure, the disc brake caliper according to any one of the first to thirteenth aspects is configured so that the end bore having a minimum diameter that is smaller than a minimum diameter of the hydraulic cylinder bore.

With the disc brake caliper according to the fourteenth aspect, the hydraulic chamber of the disc brake caliper can be maximized while reducing the overall size and weight of the disc brake caliper.

In accordance with a fifteenth aspect of the present disclosure, the disc brake caliper according to any one of the first to fourteenth aspects is configured so that the end bore includes an internal thread, and the end cap includes an external thread that is threadedly engaged with the internal thread of the end bore.

With the disc brake caliper according to the fifteenth aspect, the end cap can be easily and securely mounted to the single main body.

In accordance with a sixteenth aspect of the present disclosure, the disc brake caliper according to any one of the first to fifteenth aspects further comprises a sealing ring disposed between the end bore and the end cap.

With the disc brake caliper according to the sixteenth aspect, it is possible to securely maintain hydraulic fluid in the hydraulic chamber.

In accordance with a seventeenth aspect of the present disclosure, the disc brake caliper according to any one of the first to sixteenth aspects is configured so that the end bore is a stepped bore including a first bore section having a first diameter, a second bore section arranged between the first bore section and a hydraulic cylinder bore and having a second diameter larger than the first diameter, and a bore step section provided between the first bore section and the second bore section. The end cap includes a first cap section corresponding to the first bore section, a second cap section corresponding to the second bore section of the end bore, and a cap step section provided between the first cap section and the second cap section so as to abut the bore step section.

With the disc brake caliper according to the seventeenth aspect, the end cap can be easily and securely maintained on the single main body.

In accordance with an eighteenth aspect of the present disclosure, the disc brake caliper according to the seventeenth aspect is configured so that the first cap section of the end cap is threaded into the first bore section of the end bore, and an interface between the second cap section of the end cap and the second bore section of the end bore is sealed.

With the disc brake caliper according to the eighteenth aspect, it is possible to securely maintain hydraulic fluid in the hydraulic chamber.

In accordance with a nineteenth aspect of the present disclosure, the disc brake caliper according to any one of the first to eighteenth aspects is configured so that the single main body is configured to be mounted to a vehicle body a human-powered vehicle. The single main body includes an attachment surface and a first threaded hole. The attachment surface is configured to face a pipe portion of the vehicle body in a mounted state where the single main body is mounted on the vehicle body. The first threaded hole in which a first threaded bolt is to be inserted so as to couple the single main body to one of the vehicle body and a base member attached to the vehicle body. The first threaded hole is provided on the attachment surface.

With the disc brake caliper according to the nineteenth aspect, the disc brake caliper assembly can be easily mounted to the human-powered vehicle.

In accordance with a twentieth aspect of the present disclosure, the disc brake caliper according to the nineteenth aspect is configured so that the single main body includes a second threaded hole in which a second threaded bolt is to be inserted so as to couple the single main body to one of the vehicle body and the base member. The second threaded hole is provided on the attachment surface. No portion of the single main body extends beyond the attachment surface in a direction toward the pipe portion of the vehicle body along a line extending directly between the first threaded hole and the second threaded hole.

With the disc brake caliper according to the twentieth aspect, the disc brake caliper can be securely mounted to the human-powered vehicle with a low profile.

Also, other objects, features, aspects and advantages of the disclosed disc brake caliper will become apparent to those skilled in the art from the following detailed description, which, taken in conjunction with the annexed drawings, discloses preferred embodiments of the disc brake caliper.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
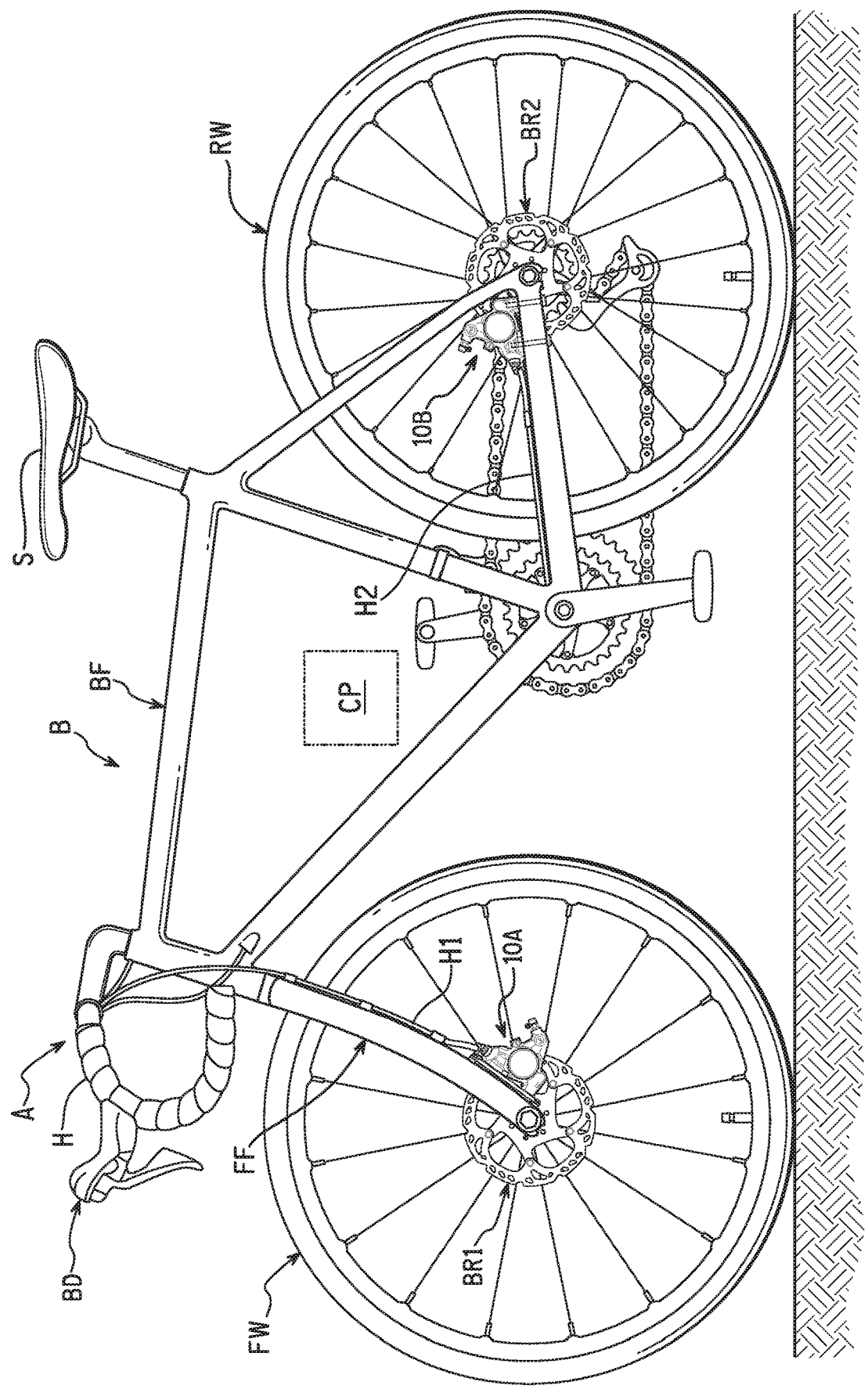
FIG. 1 is a side elevational view of a human-powered vehicle (e.g., a bicycle) equipped with a pair of disc brake calipers in accordance with one embodiment.

Referring initially to FIG. 1, a human-powered vehicle A is illustrated as a bicycle having a vehicle body B that is equipped with a pair of disc brake calipers 10A and 10B in accordance with one illustrated embodiment. The human-powered vehicle refers to a vehicle that at least partially uses human force as a prime mover for traveling and includes a vehicle that assists human force with electric power. The human-powered vehicle does not include a vehicle using only a prime mover that is not human force. In particular, the human-powered vehicle does not include a vehicle that only uses an internal combustion engine as the prime mover. The human-powered vehicle is a compact light vehicle that does not require a license for driving on a public road. Here, the human-powered vehicle A is illustrated as the bicycle, and in particular a road bike. However, the human-powered vehicle A is not limited to a road bike. For example, the human-powered vehicle A can be a bicycle with a flat style handlebar (a mountain bike or a city bike), or a three wheeled human-powered vehicle.

Basically, as seen in FIG. 1, the human-powered vehicle A defines a center plane CP. The center plane CP is a vertical the vehicle body B has a frame or frame BF and a front fork FF. The front fork FF is pivotally supported by the frame BF to pivot about an inclined vertical axle in the front portion of the frame BF. The human-powered vehicle A further comprises a drop handlebar H that is coupled to the front fork FF, and a saddle or seat S that is coupled to the frame BF. The front fork FF rotatably supports a front wheel FW at the lower end of the front fork FF. The front wheel FW has a front brake rotor BR1 that is attached to a hub of the front wheel FW so that the front brake rotor BR1 rotates integrally with the front wheel FW. The frame BF rotatably supports a rear wheel RW that is rotatably supported on a rear portion of the frame BF. The rear wheel RW has a rear brake rotor BR2 that is attached to a hub of the rear wheel RW so that the rear brake rotor BR2 rotates integrally with the rear wheel RW.

Figure 2:
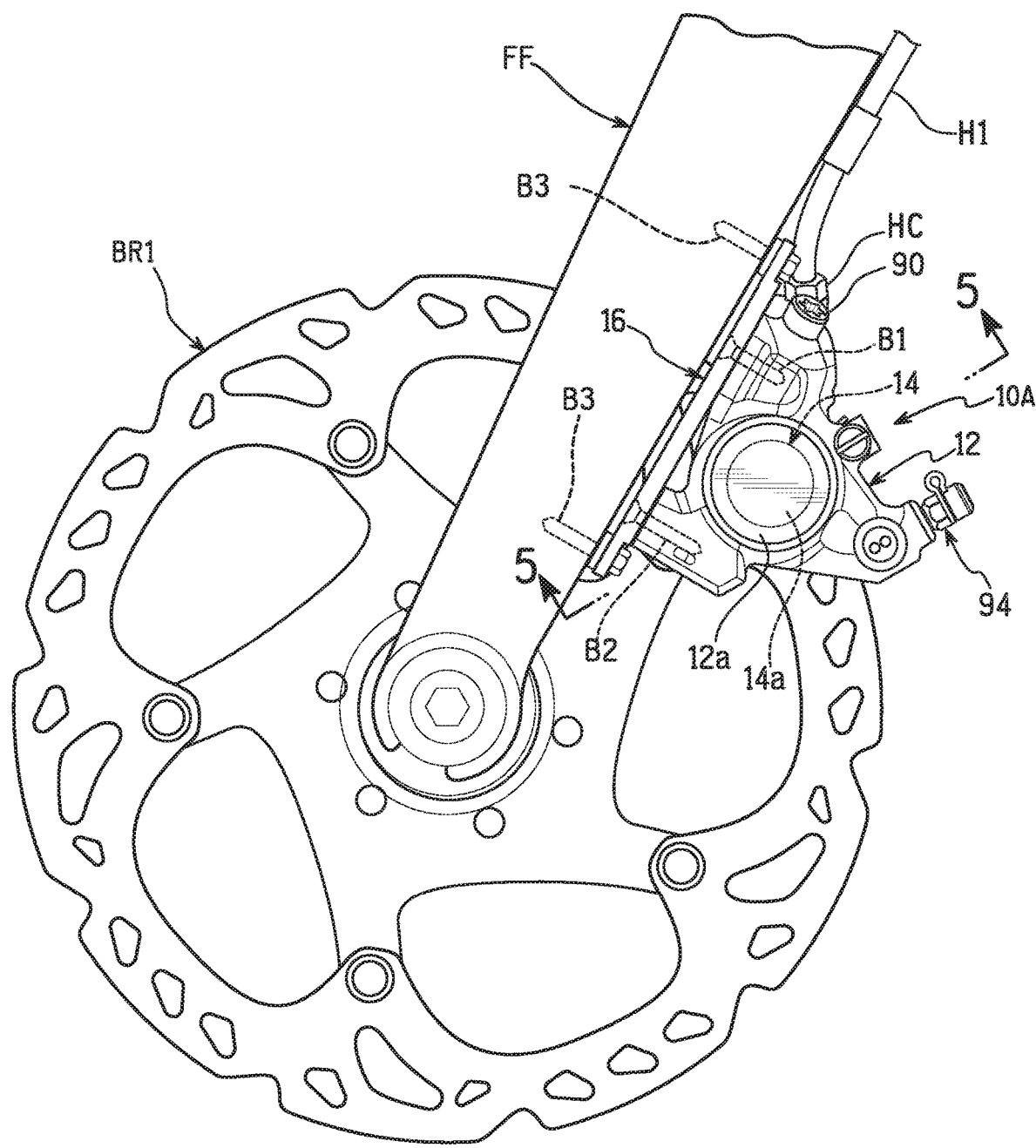
FIG. 2 is an enlarged side elevational view of a front portion of the human-powered vehicle showing the disc brake caliper mounted to the front portion of the human-powered vehicle.
Figure 3:
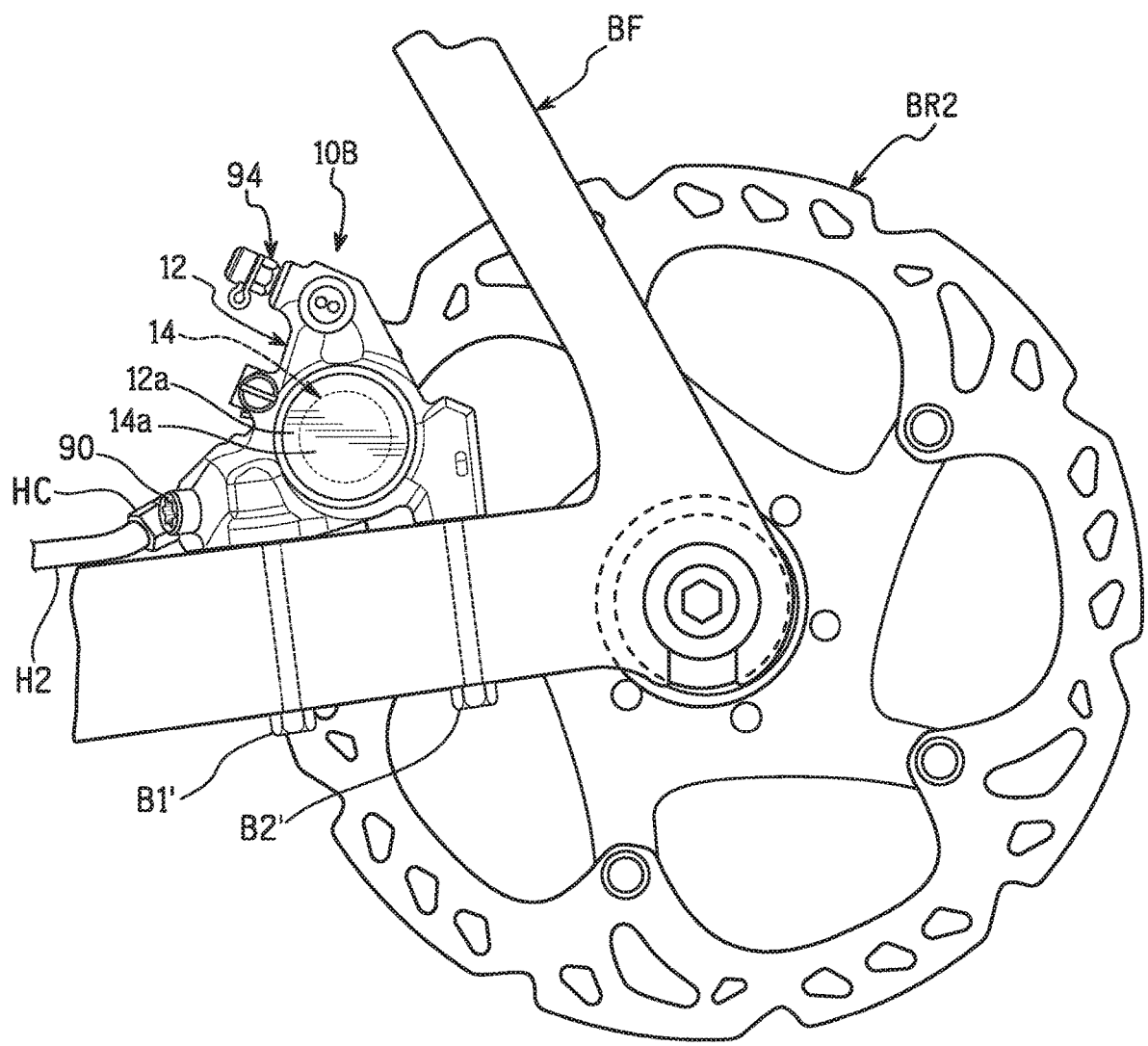
FIG. 3 is an enlarged side elevational view of a rear portion of the human-powered vehicle showing the disc brake caliper mounted to the rear portion of the human-powered vehicle.

As seen in FIGS. 1 to 3, the disc brake caliper 10A is mounted to the front fork FF of the vehicle body B, while the disc brake caliper 10B is mounted to the frame BF (i.e., a chain stay) of the vehicle body B. The disc brake caliper 10A is configured to engage the front brake rotor BR1 in a conventional manner. The disc brake caliper 10B is configured to engage the rear brake rotor BR2 in a conventional manner. Here, the disc brake calipers 10A and 10B are hydraulically operated as explained below. The disc brake caliper 10A is fluidly connected to a brake operating device BD by a first hydraulic hose H1, while the disc brake caliper 10B is fluidly connected to a brake operating device (not shown) by a second hydraulic hose H2. Here, the disc brake calipers 10A and 10B are identical. Thus, the same reference symbols will be used for the each of the parts of the disc brake calipers 10A and 10B.

As seen in FIGS. 2 and 3, each of the disc brake calipers 10A and 10B comprises a single main body 12 and an end cap 14. The single main body 12 is a one-piece member. In the illustrated embodiment, the single main body 12 is made of a metallic material (e.g., aluminum alloy, magnesium alloy and so on). However, the material of the single main body 12 is not limited to the metallic material. The single main body 12 is preferably initially casted and then subsequently machined to its final shape as seen in FIGS. 2 to 8.

The end cap 14 is a one-piece member. In the illustrated embodiment, the end cap 14 is made of a metallic material (e.g., aluminum alloy, magnesium alloy and so on). However, the material of the end cap 14 is not limited to the metallic material. The end cap 14 has an exterior surface 14a that is free of a tool engagement structure. The term "tool engagement structure" as used herein refers to a structure (protrusion and/or recess) designed to be engaged with an actual tool such as a screw drive tool (e.g., a screwdriver, a key, a wrench, a spanner, etc.). For example, the tool engagement structure includes, but not limited to, a tool recess.

Also, preferably, the exterior surface 14a of the end cap 14 is entirely a continuous even surface. The exterior surface 14a of the end cap 14 can be a flat surface as shown, or a spherically shaped surface. If the exterior surface 14a of the end cap 14 is a spherically shaped surface, preferably, the spherically shaped surface has a large radius of curvature. Also, the exterior surface 14a of the end cap 14 can be concave or convex. In any case, in the finished state, the end cap 14 does not have a tool engagement structure on the exterior surface 14a. The single main body 12 has an exterior surface 12a in which a portion of the exterior surface 12a meets flush with the exterior surface 14a of the end cap 14. In this way, the exterior surfaces 12a and 14a appear as a continuous surface without any abrupt change in direction at an interface between the exterior surfaces 12a and 14a. Here, the exterior surfaces 12a and 14a form a single continuous flat surface. However, the exterior surfaces 12a and 14a can be configured to form a single continuous curved or spherical surface as needed and/or desired. The term "flush" as used herein refers to a state of a first surface of a first part meets with a second surface of a second part to form a substantially continuous surface without any sharp change in direction.

In the illustrated embodiment, the disc brake caliper 10A and 10B each further comprises a surface treatment 16 overlying the exterior surface 12a of the single main body 12 and the exterior surface 14a of the end cap 14. Preferably, the surface treatment 16 includes at least one of an anodic oxide coating and a paint layer that covers an external seam line (shown as a broken line in FIGS. 2 and 3) between the exterior surface 12a of the single main body 12 and the exterior surface 14a of the end cap 14. The surface treatment 16 (the anodic oxide coating and/or the paint layer) that is applied to the exterior surface 12a of the single main body 12 can be applied entirely or partially over the exterior surface 12a of the single main body 12. Preferably, the surface treatment 16 (the anodic oxide coating and/or the paint layer) is applied at least over the external seam line (shown as a broken line in FIGS. 2 and 3) between the exterior surfaces 12a and 14a. In the finished state, as explained below, the external seam line between the exterior surfaces 12a and 14a is not visible to a naked human eye (i.e. viewed with a human eye that is unassisted). In the case of the paint layer being part of the surface treatment 16, the paint layer preferably includes a heat resistant paint.

The single main body 12 is configured to be mounted to the human-powered vehicle A. The single main body 12 can be indirectly or directly mounted to the vehicle body B of the human-powered vehicle A. As seen in FIG. 2, the single main body 12 of the disc brake caliper 10A is indirectly mounted to the front fork FF of the vehicle body B via a base member 18 (a mounting adapter). As seen in FIG. 3, the single main body 12 of the disc brake caliper 10B is directly mounted to the frame BF of the vehicle body B. In either case, in the illustrated embodiment, the single main body 12 includes an attachment surface 20 and a first threaded hole 21. The first threaded hole 21 is provided on the attachment surface 20. The first threaded hole 21 in which a first threaded bolt B1 or B1' is to be inserted so as to couple the single main body 12 to one of the vehicle body B and a base member 36 that is attached to the vehicle body B. In the case of the disc brake caliper 10A, the first threaded bolt B1 is threaded into the first threaded hole 21 to couple the single main body 12 to the base member 36. In the case of the disc brake caliper 10B, the first threaded bolt B1' is threaded into the first threaded hole 21 to couple the single main body 12 to the frame BF of the vehicle body B.

Preferably, as in the illustrated embodiment, the single main body 12 includes a second threaded hole 22. The second threaded hole 22 is provided on the attachment surface 20. A second threaded bolt B2 or B2' is inserted into the second threaded hole 22 so as to couple the disc brake caliper 10A or 10B to one of the vehicle body B and the base member 36. Here, a cotter pin 24 is inserted into a hole 26 to retain the second threaded bolt B2 or B2' to the single main body 12. In the case of the disc brake caliper 10A, the second threaded bolt B2 is threaded into the second threaded hole 22 to couple the single main body 12 to the base member 36. In the case of the disc brake caliper 10B, the second threaded bolt B2' is threaded into the second threaded hole 22 to couple the single main body 12 to the frame BF of the frame body B. However, it will be apparent from this disclosure that the single main body 12 can be configured to be mounted to one of the vehicle body B and the base member 36 using only one threaded bolt.

Here, in the illustrated embodiment, the attachment surface 20 is two separate surfaces. However, the attachment surface 20 can be a single continuous surface as needed an/or desired. As seen in FIGS. 2 and 3, the attachment surface 20 is configured to face a pipe portion of the vehicle body B in a mounted state where the single main body 12 is mounted on the vehicle body B. In the case of the disc brake caliper 10A, the attachment surface 20 faces the front fork FF (pipe portion) of the vehicle body B. In the case of the disc brake caliper 10B, the attachment surface 20 faces a stay tube (pipe portion) of the frame BF of the vehicle body B. In both of the disc brake calipers 10A and 10B, no portion of the single main body 12 extends beyond the attachment surface 20 in a direction toward the pipe portion of the vehicle body B along a line L (see FIG. 7) extending directly between the first threaded hole 21 and the second threaded hole 22.

When the base member 36 is used with the single main body 12, the base member 36 is attached to the front fork FF (pipe portion) of the vehicle body B using a pair of third threaded bolts B3. in this way, the base member 36 and the single main body 12 are mounted to the front fork FF (pipe portion) of the vehicle body B. Depending on the configuration of the vehicle body B, the base member 36 can be configured to be mounted to the vehicle body B using only one threaded bolt.

Figure 5:
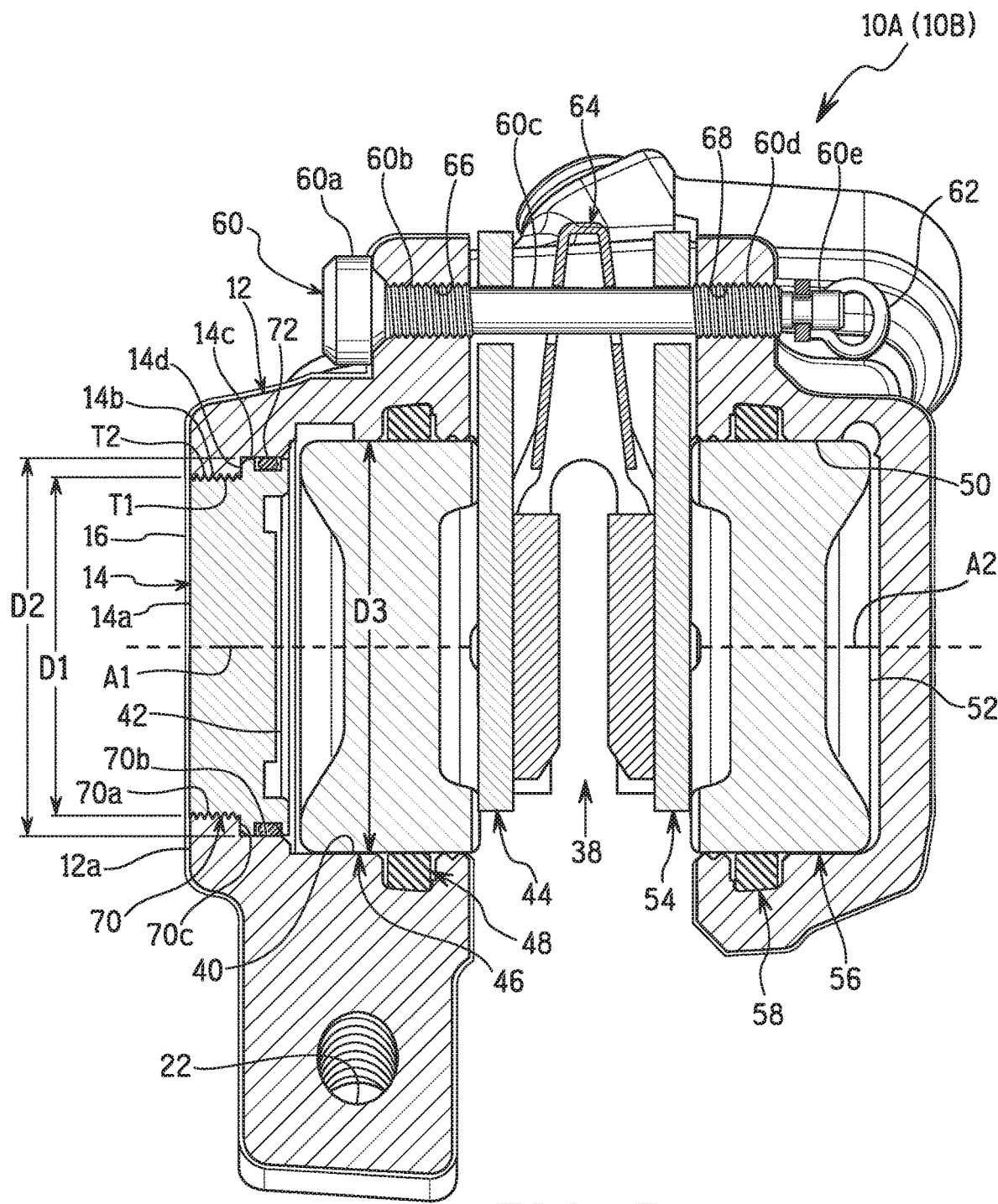
FIG. 5 is a cross sectional view of the disc brake caliper illustrated in FIGS. 2 to 4 as seen along section line 5-5 of FIG. 2.

As seen in FIG. 5, the single main body 12 has a brake rotor receiving slot 38. The brake rotor receiving slot 38 is configured to receive one of the brake rotors BR1 and BR2. Also, the single main body 12 further includes a hydraulic cylinder bore 40 that partially defines a hydraulic chamber 42 having a cylinder axis A1. Thus, the disc brake caliper 10A (10B) further comprises a brake pad 44 and a piston 46. The piston 46 is movably disposed in the hydraulic cylinder bore 40 along the cylinder axis A1. Thus, here, the piston 46 partially defines the hydraulic chamber 42. Preferably, an annular sealing ring 48 is disposed between the hydraulic cylinder bore 40 and the piston 46 to seal the interface therebetween. The annular sealing ring 48 is preferably an O-ring that is made of an elastomeric material, e.g., a rubber material that is compatible with the hydraulic fluid used in the disc brake caliper 10A (10B). The brake pad 44 is movably coupled to the single main body 12 in the brake rotor receiving slot 38.

Here, in the illustrated embodiment, the hydraulic cylinder bore 40 constitutes a first hydraulic cylinder bore and the hydraulic chamber 42 constitutes a first hydraulic chamber. Thus, the hydraulic chamber 42 will hereinafter be referred to as the first hydraulic chamber 42. Preferably, the single main body 12 further includes a second hydraulic cylinder bore 50. Thus, here, the single main body 12 further includes a second hydraulic chamber 52. The second hydraulic cylinder bore 50 partially defines the second hydraulic chamber 52 which has a cylinder axis A2. The cylinder axes A1 and A2 are preferably axially aligned with each other. The brake pad 44 constitutes a first brake pad and the piston 46 constitutes a first piston. Thus, the brake pad 44 will hereinafter be referred to as the first brake pad 44, and the piston 46 will hereinafter be referred to as the first piston 46. Further, in the illustrated embodiment, the disc brake caliper 10A (10B) includes a second brake pad 54 and a second piston 56. The second piston 56 is movably disposed in the second hydraulic cylinder bore 50 along the cylinder axis A2. Thus, here, the second piston 56 partially defines the second hydraulic chamber 52. Preferably, an annular sealing ring 58 is disposed between the second hydraulic cylinder bore 50 and the second piston 56 to seal the interface therebetween. The annular sealing ring 58 is preferably an O-ring that is made of an elastomeric material that is compatible with the hydraulic fluid used in the disc brake caliper 10A (10B). The brake pad 54 is movably coupled to the single main body 12 in the brake rotor receiving slot 38.

While the disc brake caliper 10A (10B) has a two-piston arrangement, the disc brake caliper 10A (10B) can be configured to have only a single-piston arrangement. In other words, the disc brake caliper 10A (10B) can be configured to have only the first hydraulic chamber 42 that defined by the end cap 14, the first hydraulic cylinder bore 40 and the first piston 46, as needed and/or desired.

The first and second brake pads 44 and 54 are movably attached to the single main body 12 by a support pin 60 having a clip 62. The first and second brake pads 44 and 54 are maintained spaced apart by a biasing element 64 when the disc brake caliper 10A (10B) is in a non-actuated position. The brake rotor BR1 (BR2) is disposed between the first and second brake pads 44 and 54. Here, the support pin 60 includes a head portion 60a, a first threaded portion 60b, an intermediate shaft portion 60c, a second threaded portion 60d and a stepped clip engagement portion 60e. The first and second brake pads 44 and 54 and the biasing element 64 are movably supported on the intermediate shaft portion 60c, which is relatively smooth to allow the first and second brake pads 44 and 54 and the biasing element 64 to move freely thereon. The single main body 12 includes a pair of internally threaded bores 66 and 68 for receiving the support pin 60. In particular, the first and second threaded portions 60b and 60d are screwed into internally threaded bores 66 and 68, respectively. The clip 62 is secured in a recess of the stepped clip engagement portion 60e to retain the support pin 60 to the single main body 12.

In the illustrated embodiment, the single main body 12 includes an end bore 70 that is disposed along the cylinder axis A1. The end cap 14 is coupled to the single main body 12 in the end bore 70 so as to close the hydraulic chamber 40. Here, the end cap 14 is threadedly secured in the end bore 70 of the single main body 12.

Preferably, the end bore 70 and the end cap 14 are arranged opposite to the center plane CP with respect to the single main body 12 in a mounted state where the single main body 12 is mounted to the vehicle body B. In other words, the brake rotor receiving slot 38 basically divides the single main body 12 into a first part with the first hydraulic chamber 42 and a second part with the second hydraulic chamber 52, and the end bore 70 and the end cap 14 are arranged on the first part of the single main body 12 that is farther from the center plane CP than the second part of the single main body 12 in a mounted state where the single main body 12 is mounted to the vehicle body B. In this way, the end cap 14 and the end bore 70 are arranged on laterally outer side of the single main body 12 with respect to the vehicle body B in the mounted state.

As seen in FIG. 5, the end bore 70 is a stepped bore that includes a first bore section 70a, a second bore section 70b and a bore step section 70c. The first bore section 70a has a first diameter D1. The second bore section 70b is arranged between the first bore section 70 and the first hydraulic cylinder bore 40. The second bore section 70b has a second diameter D2 that is larger than the first diameter D1. The bore step section 70c is provided between the first bore section 70a and the second bore section 70b.

The end cap 14 includes a first cap section 14b, a second cap section 14c and a cap step section 14d. The first cap section 14b corresponds to the first bore section 70a. In other words, the first cap section 14b is disposed in to the first bore section 70a. Thus, the first cap section 14b has a third diameter that is equal to the first diameter D1 of the first bore section 70a of the end bore 70. The second cap section 14c corresponds to the second bore section 70b of the end bore 70. In other words, the second cap section 14c is disposed in the second bore section 70b of the end bore 70. Thus, the second cap section 14c has fourth diameter that is equal to the second diameter D2 of the second bore section 70b. The cap step section 14d is provided between the first cap section 14b and the second cap section 14c so as to abut the bore step section 70c. the end bore 70 having a minimum diameter (the first diameter D1) that is smaller than a minimum diameter D3 of the first hydraulic cylinder bore 40. As seen in FIG. 5, the exterior surface 14a of the end cap 14 defines an outer peripheral edge that is flush with an outer peripheral edge of the end bore 70.

Here, the first cap section 14b of the end cap 14 is threaded into the first bore section 70a of the end bore 70. Thus, the end bore 70 includes an internal thread T1, and the end cap 14 includes an external thread T2 that is threadedly engaged with the internal thread T1 of the end bore 70. Preferably, an interface between the second cap section 14c of the end cap 14 and the second bore section 70b of the end bore 70 is sealed. Here, the disc brake caliper 10A (10B) further comprises a sealing ring 72 that is disposed between the end bore 70 and the end cap 14. The sealing ring 72 is preferably an O-ring that is made of an elastomeric material, e.g., a rubber material that is compatible with the hydraulic fluid used in the disc brake caliper 10A (10B). In this way, an interface between the end cap 14 and the end bore 70 is sealed. More specifically, the sealing ring 72 is disposed in the interface between the second cap section 14c of the end cap 14 and the second bore section 70b of the end bore 70. For example, the second cap section 14c of the end cap 14 is provided with an annular groove that has the sealing ring 72 disposed therein.

Figure 6:
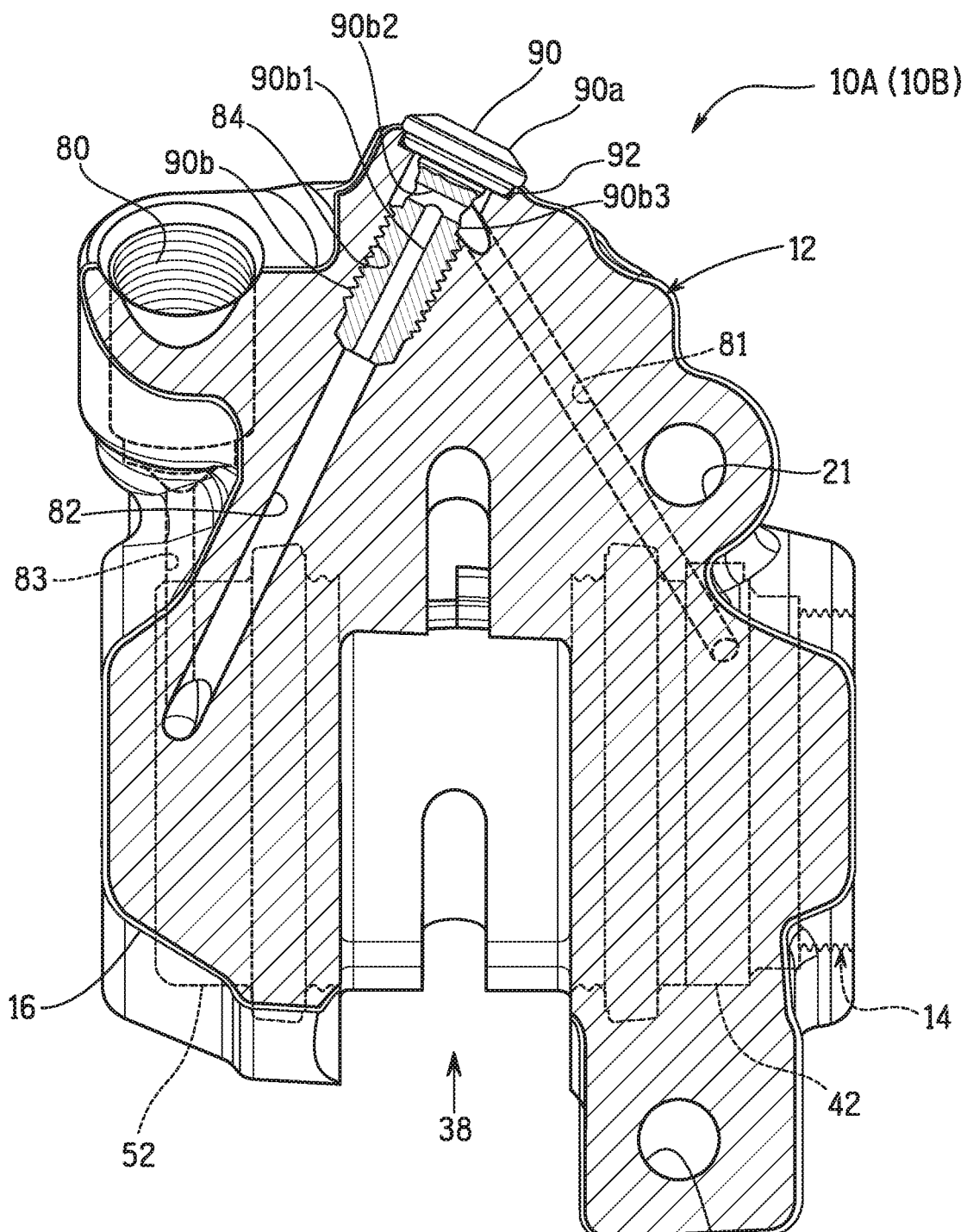
FIG. 6 is a cross sectional view of the disc brake caliper illustrated in FIGS. 2, 3 and 5 as seen along section line 6-6 of FIG. 4, but with various parts removed.
Figure 7:
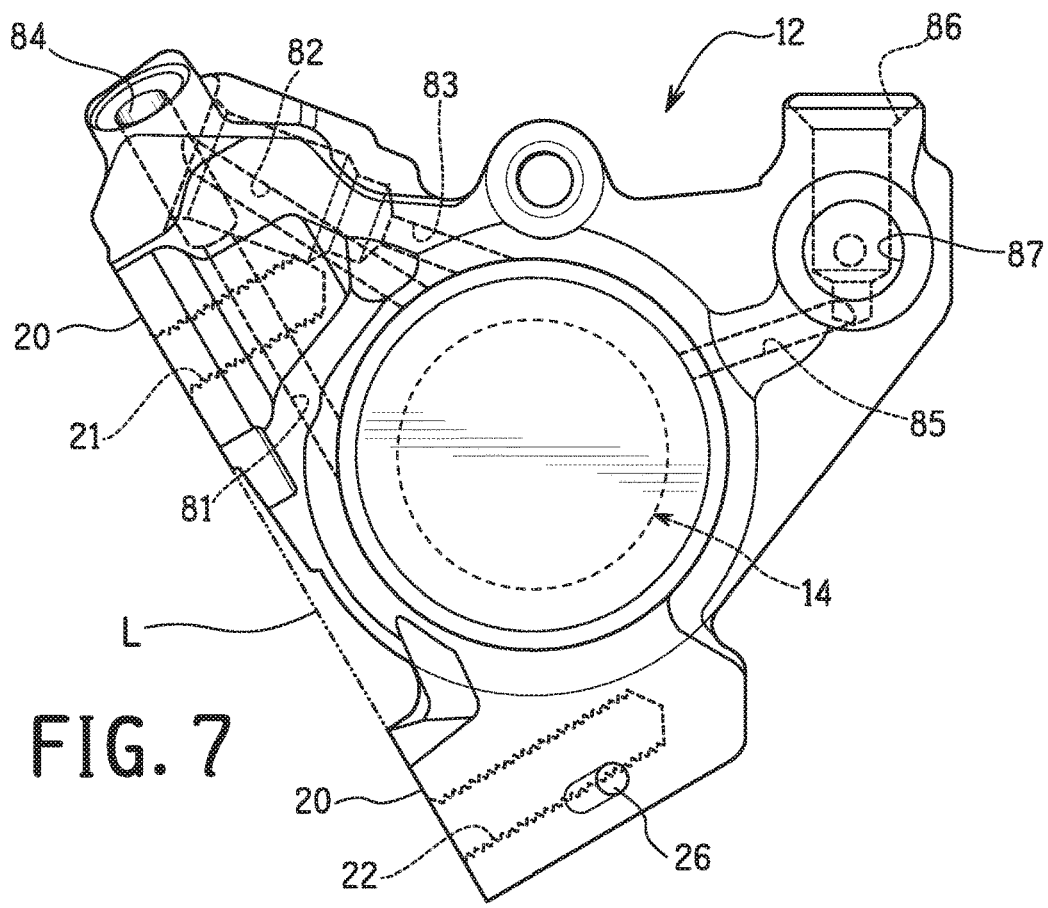
FIG. 7 is a side elevational view of the main body of the disc brake caliper illustrated in FIGS. 2 to 6.
Figure 8:
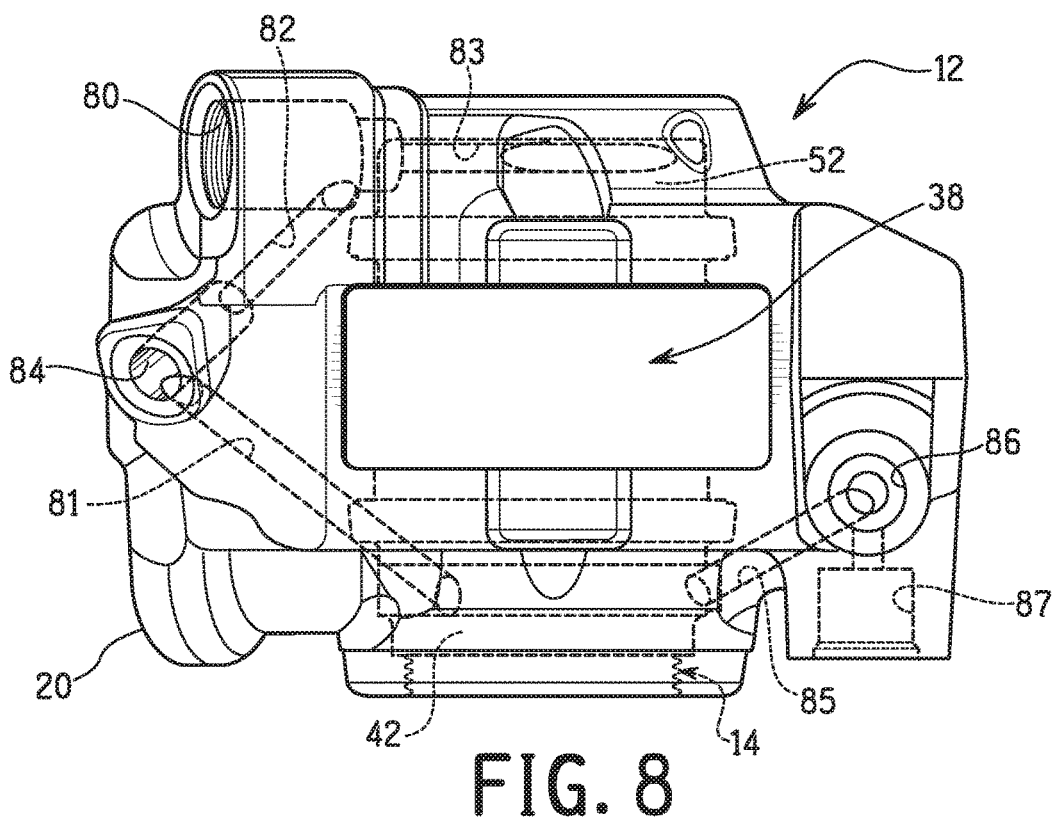
FIG. 8 is an edge view of the main body of the disc brake caliper illustrated in FIG. 8.

Now, as seen in FIGS. 6 to 8, the flow of the hydraulic fluid within the single main body 12 will now be discussed. The single main body 12 includes a fluid input port 80 that is connected to the hydraulic hose H1 or H2 via a conventional hose connector HC (see FIGS. 2 and 3). Here, the fluid input port 80 is a threaded bore that threadedly receives the hose connector HC of the hydraulic hose H1 or H2. The single main body 12 includes a first hydraulic fluid passage 81 and a second hydraulic fluid passage 82. The first hydraulic fluid passage 81 is in fluid communication with the first hydraulic chamber 42. The second hydraulic fluid passage 82 is in fluid communication with the second hydraulic chamber 52. The fluid input port 80 is fluidly connected to the second hydraulic chamber 52 by a third hydraulic fluid passage 83. An opening 84 is provided in the single main body 12 to fluidly connect the first hydraulic fluid passage 81 to the second hydraulic fluid passage 82 as discussed below.

Figure 4:
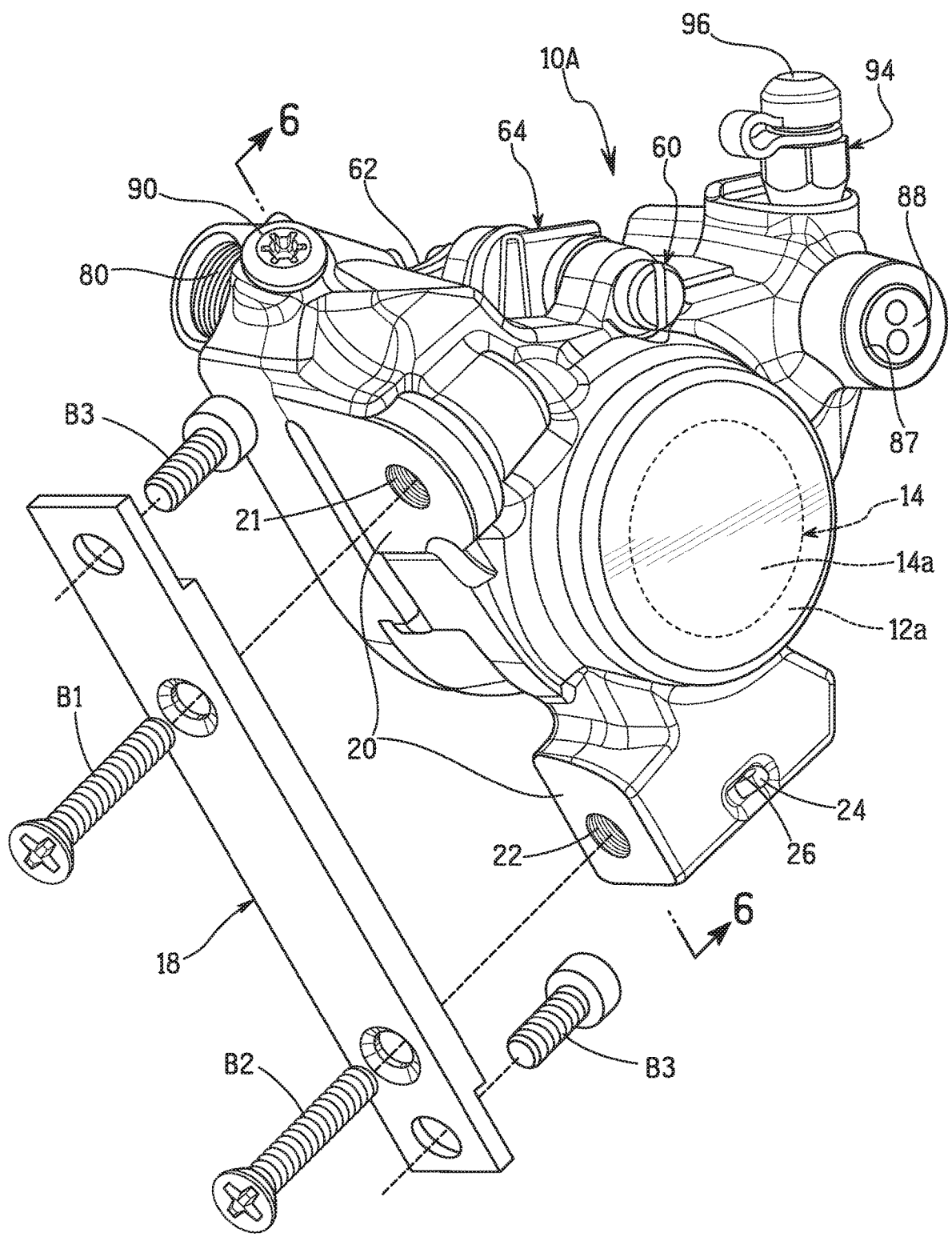
FIG. 4 is an outside perspective view of the disc brake caliper illustrated in FIGS. 2 and 3.

Preferably, the single main body 12 is provided with a hydraulic fluid bleeding arrangement for bleeding the braking system to remove air and/or hydraulic fluid from the braking system. Here, for removing air and/or hydraulic fluid from the braking system, the single main body 12 further includes a hydraulic fluid passage 85 that fluidly connects the first hydraulic chamber 42 to a bleed bore 86. The single main body 12 is provided with a drain bore 87 that is fluidly connected to the hydraulic fluid passage 85. The drain bore 87 is closed off by a plug 88 as seen in FIG. 4. Here, the drain bore 87 is at least partially threaded so that the plug 88 can be screwed into the drain bore 87. The plug 88 preferably includes an annular seal (not shown) to seal an interface between the drain bore 87 and the plug 88.

As seen in FIGS. 4 and 5, the disc brake caliper 10A (10B) further comprises a sealing bolt 90 plugging an opening in the single main body 12. The sealing bolt 90 includes a head portion 90a and a shaft portion 90b extending from the head portion 90a. A sealing ring 92 is provided on the shaft portion 90b adjacent the head portion 90a. The sealing ring 92 is preferably an O-ring that is made of an elastomeric material, e.g., rubber material that is compatible with the hydraulic fluid used in the disc brake caliper 10A (10B).

The shaft portion 90b has a first fluid bore 90b1 extending in an axial direction of the shaft portion 90b and a second fluid bore 90b2 extending in in a traverse direction of the shaft portion 90b. The second fluid bore 90b2 is in fluid communication with the first fluid bore 90b1. The second hydraulic fluid passage 82 is in fluid communication with the first hydraulic fluid passage 81 via the first and second fluid bores 90b1 and 90b2 of the sealing bolt 90. In this way, the first hydraulic fluid passage 81 extends between the first hydraulic chamber 42 and the second hydraulic fluid passage 82. The second hydraulic fluid passage 82 extends between the second hydraulic chamber 52 and the first hydraulic fluid passage 81.

The shaft portion 90b has a threaded section 90b3 disposed on an opposite side of the second fluid bore 90b2 from the head portion 90a. The shaft portion 90b of the sealing bolt 90 includes a reduced section 90b3 having a cross sectional width that is reduced as compared to a cross sectional width of the threaded section 90b3. The second fluid bore 90b2 is disposed in the reduced section 90b3.

Figure 9:
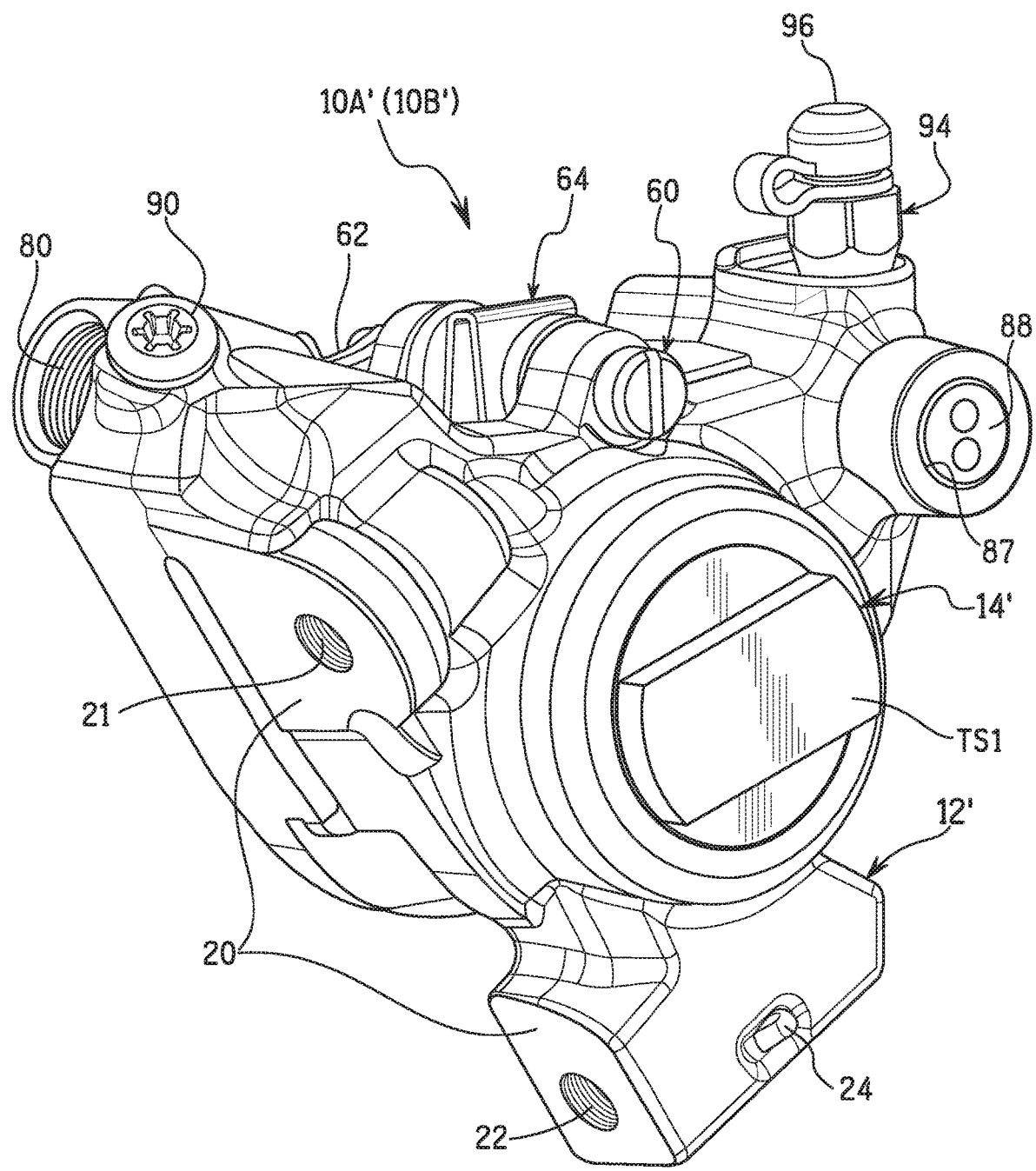
FIG. 9 is an outside perspective view of an unfinished disc brake caliper prior to removal portions of the main body and the end cap of the unfinished disc brake caliper to form the single main body illustrated in FIGS. 2 to 8.

As seen in FIG. 9, an unfinished disc brake caliper 10A' (10B') is illustrated. The unfinished disc brake caliper 10A' (10B') has an unfinished single main body 12' and an unfinished end cap 14'. Basically, the disc brake caliper 10A (10B) is formed by removing a portion of the unfinished single main body 12' and a portion of the unfinished end cap 14' from the unfinished disc brake caliper 10A' (10B') and then applying the anodic oxide coating and/or the paint layer of the surface treatment 16.

Figure 10:
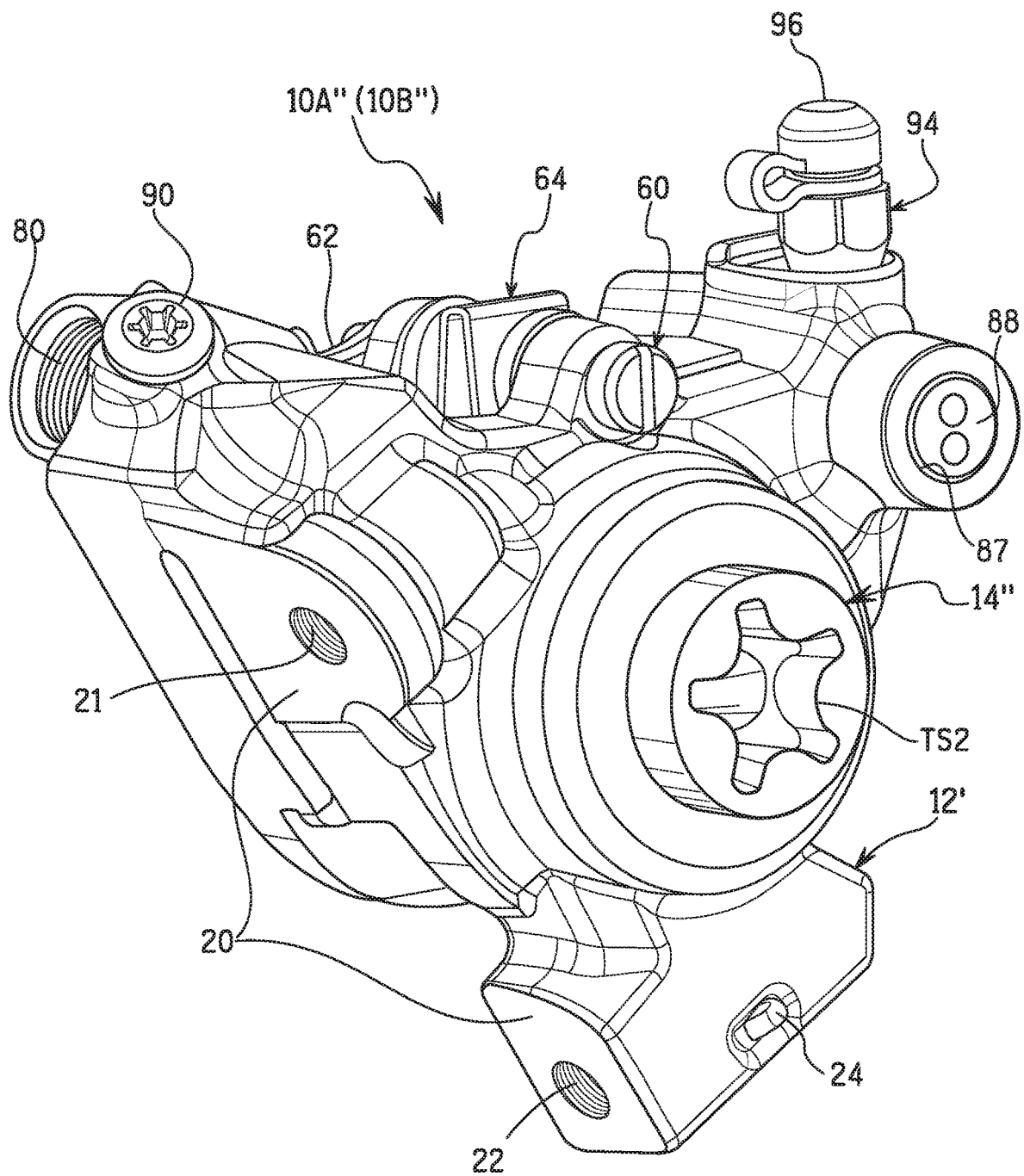
FIG. 10 is an outside perspective view of an alternative unfinished disc brake caliper prior to removal portions of the main body and the end cap of the unfinished disc brake caliper to form the single main body illustrated in FIGS. 2 to 8.

Here, the unfinished end cap 14' has a tool engagement structure TS1 includes a protrusion having two parallel tool engagement surfaces for receiving a torque from a wrench. Alternatively, as seen in FIG. 10, an unfinished disc brake caliper 10A" (10B") is illustrated having the unfinished single main body 12' and an unfinished end cap 14". Here, the unfinished end cap 14" has a tool engagement structure TS2 includes a recess having two parallel tool engagement surfaces for receiving a torque from a hexalobular screwdriver. However, the tool engagement structure for the unfinished end cap is not limited to these two illustrated tool engagement structures.

In any case, to form the single main body 12 and the end cap 14 of the disc brake caliper 10A (10B), the end portions of the unfinished single main body 12' and the unfinished end cap 14' or 14" are removed to the tool engagement structure TS1 or TS2 to form a smooth end surface. Thus, when the anodic oxide coating and/or the paint layer of the surface treatment 16 is applied, the end cap 14 becomes undetectable be the naked human eye.

Figure 11:
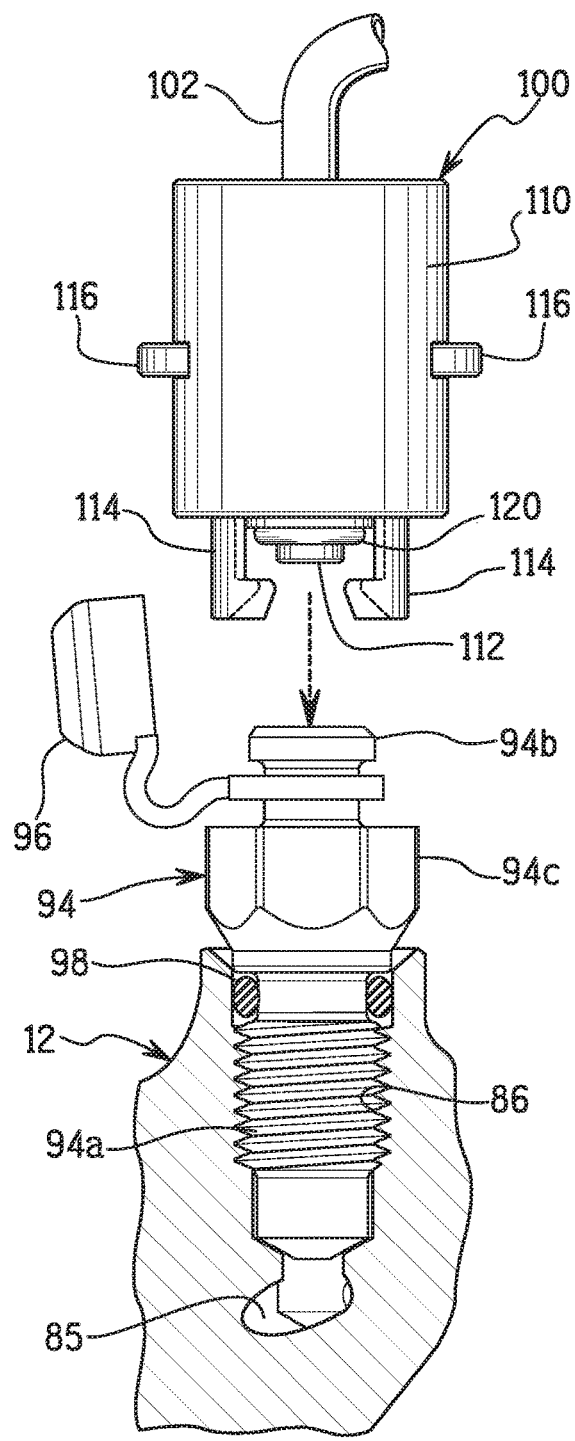
FIG. 11 is a partial cross sectional view of the single main body illustrated in FIGS. 2 to 8 in the area of the bleed valve with a brake bleeding tool shown in prior to attachment.
Figure 12:
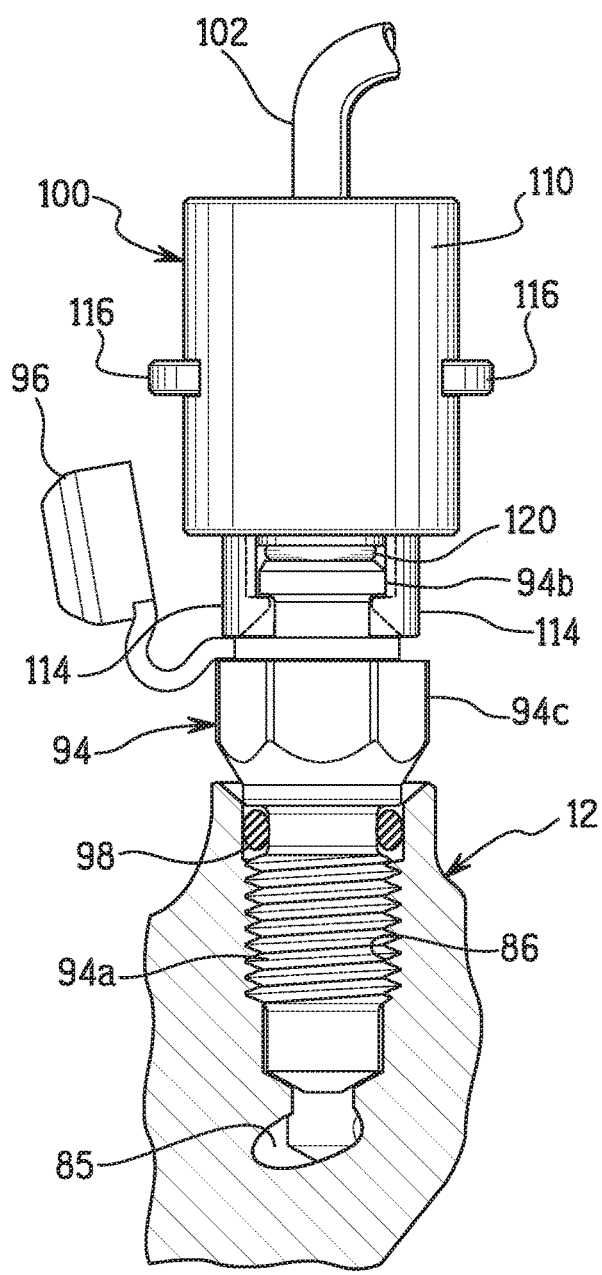
FIG. 12 is a partial cross sectional view of the single main body illustrated in FIGS. 2 to 8 in the area of the bleed valve with the brake bleeding tool shown in the attached position.

Referring now to FIGS. 11 and 12, the disc brake caliper 10A (10B) further includes a bleed valve 94 that is threaded into the bleed bore 86 of the single main body 12. The bleed valve 94 is used for manually bleeding the disc brake caliper 10A (10B) as discussed below. The bleed valve 94 is provided with a cap 96 and an annular sealing ring 98. The bleed valve 94 basically includes a shaft portion 94a, a head portion 94b and a tool engagement portion 94c that is disposed between the shaft portion 94a and the head portion 94b. The cap 96 is provided on the head portion 94b and the annular sealing ring 98 is provided on the shaft portion 94a. The cap 96 is manufactured from a pliable plastic which expands and then relaxes when installed on the head portion 94b. The annular sealing ring 98 seals the interface between the single main body 12 and the shaft portion 94a. The annular sealing ring 98 is preferably an O-ring that is made of an elastomeric material that is compatible with the hydraulic fluid used in the disc brake caliper 10A (10B). Since bleed valves are generally well known to be used in braking systems, the bleed valve 94 will only be briefly described herein.

In the bleed valve 94, the shaft portion 94a has an external thread that is configured to be screwed into the bleed bore 86 of the single main body 12 to selectively close and opening the hydraulic fluid passage 85 for manually bleeding the disc brake caliper 10A (10B). The head portion 94b has a frusto-conical shaped end section and a reduced diameter section that is disposed between the shaft portion 94a and the frusto-conical shaped end section. The cap 96 is retained on the reduced diameter section of the head portion 94b. The bleed valve 94 has an axially extending bore 94d that extends from the tip of the head portion 94b and into the shaft portion 94a to a position short of the tip of the shaft portion 94a. In other words, the axially extending bore 94d does not extend completely through the shaft portion 94a. The bleed valve 94 also has a transverse bore 94e that intersects with the axially extending bore 94d near the tip of the shaft portion 94a. In this way, hydraulic fluid can flow into the axially extending bore 94d via the transverse bore 94e, and then flow out of the tip of the head portion 94b.

Referring now to FIGS. 11 to 15, a brake bleeding tool 100 is illustrated for manually bleeding the disc brake caliper 10A (10B). The brake bleeding tool 100 is connected to a tube 102, which is manufactured from a material that is compatible with the hydraulic fluid used in the disc brake caliper 10A (10B). The tube 102 is of sufficient length that the tube 102 can reach between the disc brake caliper 10A (10B) in a state mounted to the frame and a container (not shown) for holding the discarded hydraulic fluid from the disc brake caliper 10A (10B).

Figures 13, 14:
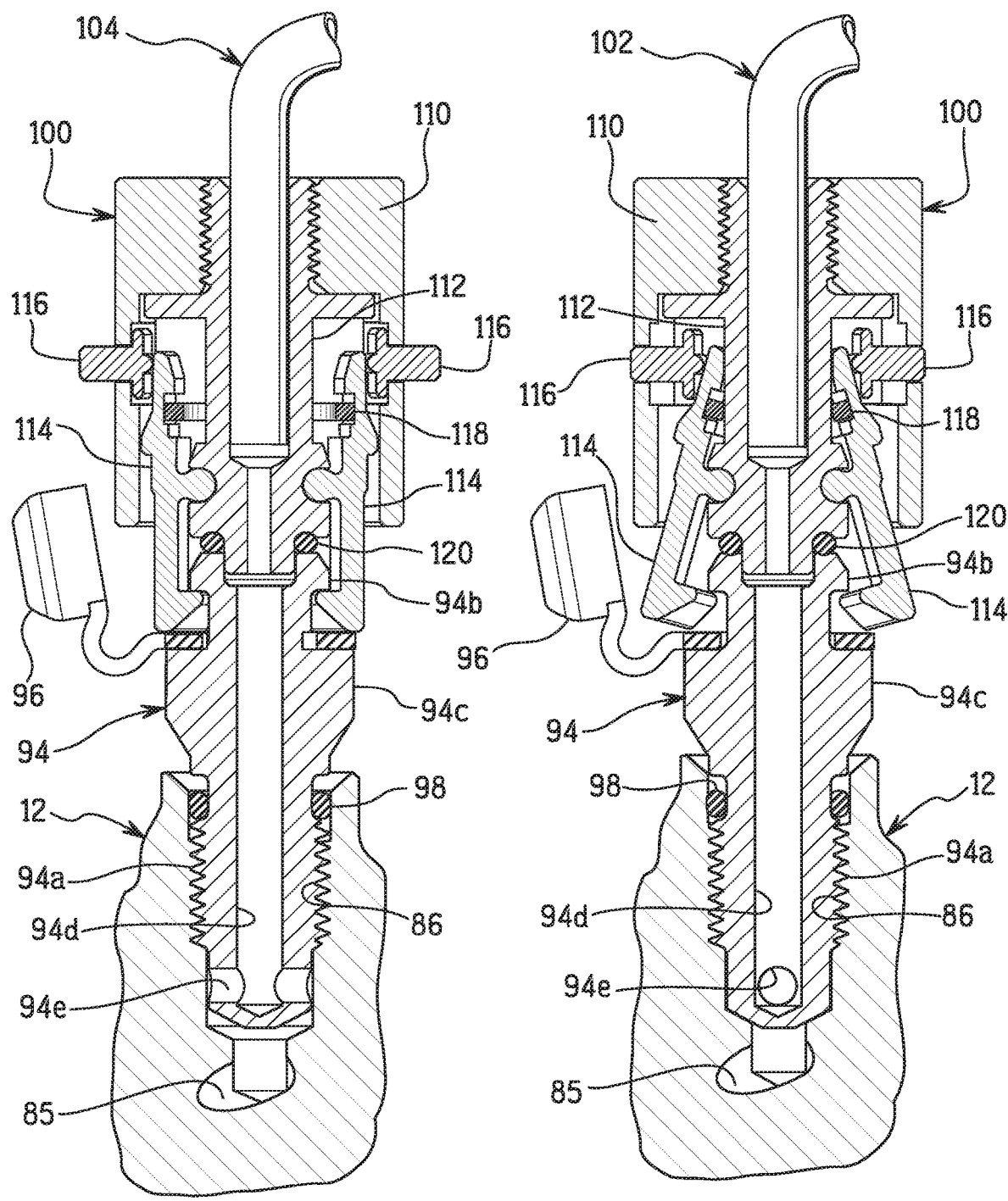
FIG. 13 is a cross sectional view of the brake bleeding tool and a portion of the disc brake caliper illustrated in FIGS. 2 to 8 in the area of the bleed valve with the brake bleeding tool shown in the attached position.
FIG. 14 is a cross sectional view of the brake bleeding tool and a portion of the disc brake caliper illustrated in FIGS. 2 to 8 in the area of the bleed valve with the brake bleeding tool shown in the process of being detached from the bleed valve.

In using the brake bleeding tool 100, first, the cap 96 of the bleed valve 94 is removed from the frusto-conical shaped end section of the head portion 94b to expose the axially extending bore 94d as seen in FIG. 11. Then, as seen in FIG. 12, the brake bleeding tool 100 is attached to the head portion 94b. Next, as seen in FIG. 13, the bleed valve 94 is partially unscrewed from the bleed bore 86 of the single main body 12. In this way, the axially extending bore 94d of the bleed valve 94 becomes fluid in communication with the hydraulic fluid passage 85 of the single main body 12 so that air and/or hydraulic fluid can be removed from the braking system. Once the bleeding process is completed, the bleed valve 94 is screwed back into the bleed bore 86 of the single main body 12 to seal off the end of the hydraulic fluid passage 85 of the single main body 12 as seen in FIG. 14. Finally, as seen in FIG. 14, the brake bleeding tool 100 can be detached from the head portion 94*b* of the bleed valve 94.

Figure 15:
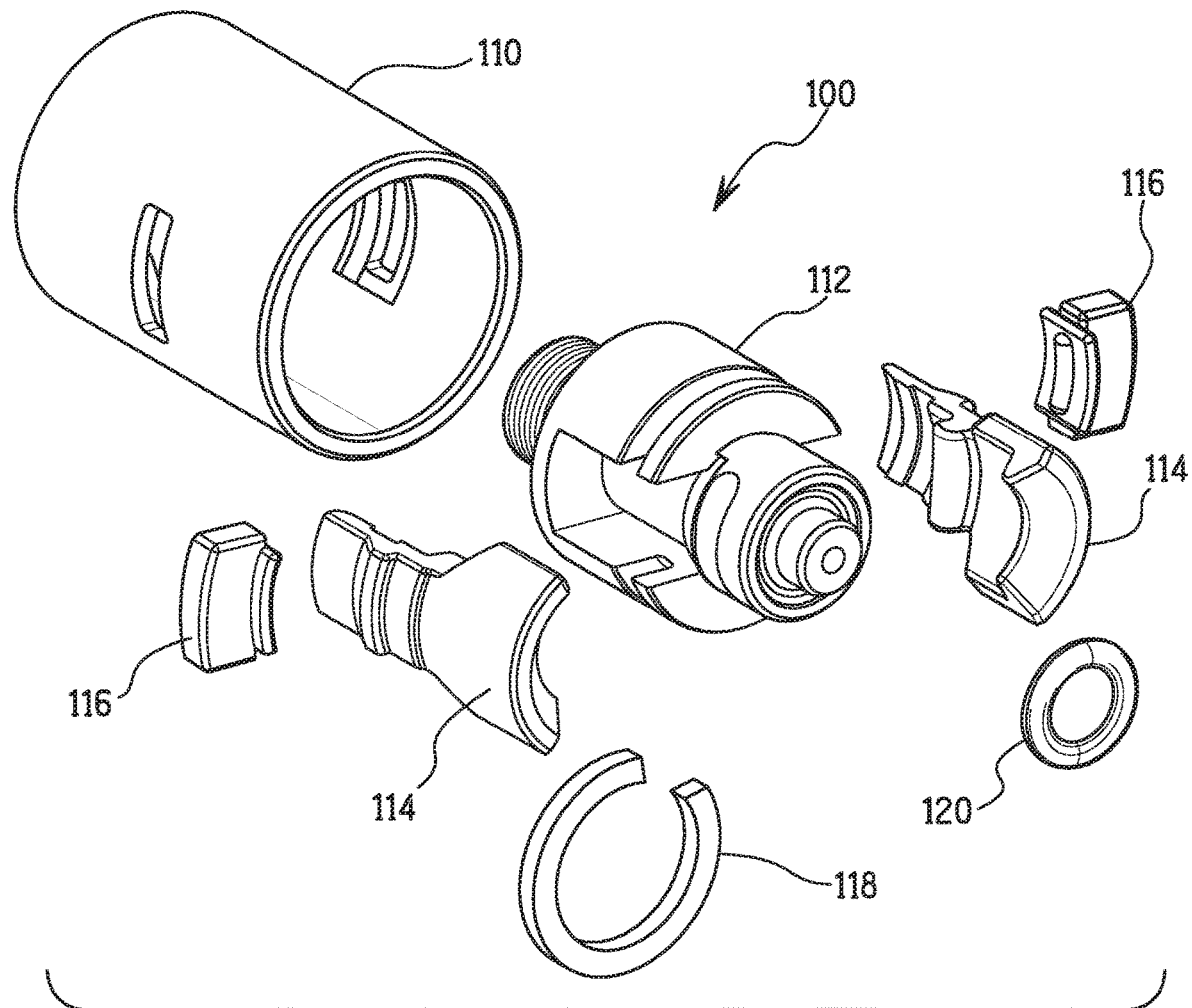
FIG. 15 is an exploded perspective view of the brake bleeding tool shown in FIGS. 11 to 14.

As seen in FIGS. 13 to 15, the bleed valve 94 basically includes a housing 100, a fluid connection body 112 and a pair of coupling members or jaws 114. The coupling jaws 114 are pivotally coupled to the fluid connection body 112, and retained on the fluid connection body 112 by the housing 100. The bleed valve 94 further includes a pair of operating members 116 for pivoting the coupling jaws 114 from a coupling position (FIG. 13) to a release or non-coupling position (FIG. 14). A biasing element 118 is provided between the fluid connection body 112 and the coupling jaws 114 to bias the coupling jaws 114 towards the coupling position. Here, the biasing element 118 is a split ring made of an elastomeric material. However, the biasing element 118 is not limited to this structure. For example, the biasing element 118 can be one or more springs such as leaf springs and/or coil springs. The operating members 116 are slidably disposed on the housing 100 and spaced one hundred and eighty degrees apart. Thus, a user squeezes the operating members 116 to move the coupling jaws 114 from the coupling position to the non-coupling position. Preferably, the fluid connection body 112 is threadedly connected to the housing 100. Also, preferably, the fluid connection body 112 is provided with a sealing ring 120 on the tip end that mates with the axially extending bore 94*d* in the head portion 94*b* of the bleed valve 94.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the disc brake caliper. Accordingly, these directional terms, as utilized to describe the disc brake caliper should be interpreted relative to a bicycle in an upright riding position on a horizontal surface and that is equipped with the disc brake caliper. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A disc brake caliper comprising:
   a single main body including a hydraulic cylinder bore partially defining a hydraulic chamber having a cylinder axis and an end bore disposed along the cylinder axis;
   an end cap coupled to the single main body in the end bore so as to close the hydraulic chamber, the end cap having an exterior surface that is free of a tool engagement structure; and
   a surface treatment overlying an exterior surface of the single main body and the exterior surface of the end cap, the surface treatment including a paint layer that covers an external seam line between the exterior surface of the single main body and the exterior surface of the end cap such that the external seam line is not visible.

2. The disc brake caliper according to claim 1, further comprising
a single main body including a hydraulic cylinder bore partially defining a hydraulic chamber having a cylinder axis and an end bore disposed along the cylinder axis;
an end cap coupled to the single main body in the end bore so as to close the hydraulic chamber, the end cap having an exterior surface that is free of a tool engagement structure;
a sealing bolt plugging an opening in the single main body, the sealing bolt including a head portion and a shaft portion extending from the head portion, the shaft portion having a first fluid bore extending in an axial direction of the shaft portion and a second fluid bore extending in a traverse direction of the shaft portion, the second fluid bore being in fluid communication with the first fluid bore, the shaft portion having a threaded section disposed on an opposite side of the second fluid bore from the head portion, and
the single main body including a first hydraulic fluid passage in fluid communication with the hydraulic chamber and a second hydraulic fluid passage in fluid communication with the first hydraulic fluid passage via the first and second fluid bores of the sealing bolt.

3. The disc brake caliper according to claim 2, wherein the shaft portion of the sealing bolt includes a reduced section having a cross sectional width that is reduced as compared to a cross sectional width of the threaded section, the second fluid bore being disposed in the reduced section.

4. The disc brake caliper according to claim 2, wherein the hydraulic cylinder bore constitutes a first hydraulic cylinder bore and the hydraulic chamber constitutes a first hydraulic chamber,
the single main body further includes a second hydraulic chamber, the first hydraulic fluid passage extends between the first hydraulic chamber and the second hydraulic fluid passage, the second hydraulic fluid passage extends between the second hydraulic chamber and the first hydraulic fluid passage.

5. The disc brake caliper according to claim 1, wherein the single main body has a brake rotor receiving slot.

6. The disc brake caliper according to claim 5, further comprising
a brake pad movably coupled to the single main body in the brake rotor receiving slot; and
a piston partially defining a hydraulic chamber and movably disposed in the hydraulic cylinder bore along the cylinder axis.

7. The disc brake caliper according to claim 1, wherein the end bore is a stepped bore including a first bore section having a first diameter, a second bore section arranged between the first bore section and a hydraulic cylinder bore and having a second diameter larger than the first diameter, and a bore step section provided between the first bore section and the second bore section,
the end cap includes a first cap section corresponding to the first bore section, a second cap section corresponding to the second bore section of the end bore, and a cap step section provided between the first cap section and the second cap section so as to abut the bore step section.

8. The disc brake caliper according to claim 7, wherein the first cap section of the end cap is threaded into the first bore section of the end bore, and
an interface between the second cap section of the end cap and the second bore section of the end bore is sealed.

9. The disc brake caliper according to claim 1, wherein the single main body is configured to be mounted to a vehicle body of a human-powered vehicle,
the single main body includes:
an attachment surface being configured to face a pipe portion of the vehicle body in a mounted state where the single main body is mounted on the vehicle body; and
a first threaded hole in which a first threaded bolt is to be inserted so as to couple the single main body to one of the vehicle body and a base member attached to the vehicle body, the first threaded hole being provided on the attachment surface.

10. The disc brake caliper according to claim 9, wherein the single main body includes a second threaded hole in which a second threaded bolt is to be inserted so as to couple the single main body to one of the vehicle body and the base member, the second threaded hole being provided on the attachment surface, and
no portion of the single main body extends beyond the attachment surface in a direction toward the pipe portion of the vehicle body along a line extending directly between the first threaded hole and the second threaded hole.

11. The disc brake caliper according to claim 1, wherein the surface treatment includes an anodic oxide coating.

12. The disc brake caliper according to claim 1, wherein the single main body is configured to be mounted to a human-powered vehicle defining a center plane, and
the end bore and the end cap are arranged opposite to the center plane with respect to the single main body in a mounted state where the single main body is mounted to the human-powered vehicle.

13. The disc brake caliper according to claim 1, wherein the exterior surface of the end cap is entirely a continuous even surface.

14. The disc brake caliper according to claim 1, wherein the exterior surface of the end cap defines an outer peripheral edge that is flush with an outer peripheral edge of the end bore.

15. The disc brake caliper according to claim 1, wherein the end bore having a minimum diameter that is smaller than a minimum diameter of the hydraulic cylinder bore.

16. The disc brake caliper according to claim 1, wherein the end bore includes an internal thread, and
the end cap includes an external thread that is threadedly engaged with the internal thread of the end bore.

17. The disc brake caliper according to claim 1, further comprising
a sealing ring disposed between the end bore and the end cap.

18. A disc brake caliper comprising:
a single main body including a hydraulic cylinder bore partially defining a hydraulic chamber having a cylinder axis and an end bore disposed along the cylinder axis;
an end cap coupled to the single main body in the end bore so as to close the hydraulic chamber, the end cap having an exterior surface that is entirely a continuous even surface; and a surface treatment overlying an exterior surface of the single main body and the exterior surface of the end cap, the surface treatment including a paint layer that covers an external seam line between the exterior surface of the single main body and the exterior surface of the end cap such that the external seam line is not visible.

* * * * *